(12) United States Patent
Steffey et al.

(10) Patent No.: US 10,589,740 B2
(45) Date of Patent: Mar. 17, 2020

(54) AUTOMATED COLLISION MITIGATION SYSTEM OF A VEHICLE AND METHOD THEREOF

(71) Applicants: HYUNDAI MOTOR COMPANY, Seoul (KR); KIA MOTORS CORPORATION, Seoul (KR)

(72) Inventors: Joseph Steffey, Brownstown Township, MI (US); Gerald Spradlin, Milan, MI (US); Bilal Javaid, Ada, MI (US); Tarek Matt, Canton, MI (US); Amanda Christiana, Ann Arbor, MI (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/954,038

(22) Filed: Apr. 16, 2018

(65) Prior Publication Data

US 2019/0315343 A1 Oct. 17, 2019

(51) Int. Cl.
*B60W 30/085* (2012.01)
*B60W 50/00* (2006.01)
(Continued)

(52) U.S. Cl.
CPC ...... *B60W 30/085* (2013.01); *B60W 30/0956* (2013.01); *B60W 50/0097* (2013.01); *G05D 1/0246* (2013.01); *G05D 1/0257* (2013.01); *B60W 2030/082* (2013.01); *B60W 2050/0002* (2013.01); *B60W 2050/0014* (2013.01); *B60W 2400/00* (2013.01); *B60W 2420/42* (2013.01); *B60W 2420/52* (2013.01); *B60W 2550/308* (2013.01); *B60W 2710/18* (2013.01);
(Continued)

(58) Field of Classification Search
CPC .......... B60W 30/085; B60W 30/0956; B60W 50/0097; B60W 2050/0014; B60W 2710/20; B60W 2050/0002; B60W 2750/308; B60W 2710/18; B60W 2550/308; B60W 2420/52; B60W 2420/42; B60W 2400/00; B60W 2030/082; B60W 2720/106; G05D 1/0257; G05D 1/0246; G05D 2201/0213
See application file for complete search history.

(56) References Cited

U.S. PATENT DOCUMENTS

| | | |
|---|---|---|
| 8,831,870 B2 | 9/2014 | Whikehart et al. |
| 2016/0207530 A1* | 7/2016 | Stanek ................ B60W 30/09 |
| 2017/0001636 A1 | 1/2017 | Laur et al. |

* cited by examiner

*Primary Examiner* — Yuen Wong
(74) *Attorney, Agent, or Firm* — Brinks Gilson & Lione (57) ABSTRACT

An automated collision mitigation system of a vehicle includes a vehicle controller, a free space monitor unit, a rear collision monitor unit, a communicator, a drivetrain system and a braking system. The free space monitor unit detects a free space in front of a host vehicle and the rear collision monitor unit detect parameters of a remote vehicle located rearwardly of the host vehicle. The communicator sends and receives signal from the other vehicles or infrastructures by V2V or V2I wireless network. The vehicle controller evaluates an accelerating time of the host vehicle and a time-to-collision of the rear remote vehicle. In addition, the vehicle controller determines to activate the drivetrain system or the braking system of the host vehicle.

19 Claims, 5 Drawing Sheets

(51) Int. Cl.
*G05D 1/02* (2020.01)
*B60W 30/095* (2012.01)
*B60W 30/08* (2012.01)

(52) U.S. Cl.
CPC ... *B60W 2710/20* (2013.01); *B60W 2720/106* (2013.01); *B60W 2750/308* (2013.01); *G05D 2201/0213* (2013.01)

AUTOMATED COLLISION MITIGATION SYSTEM OF A VEHICLE AND METHOD THEREOF

TECHNICAL FIELD

The present disclosure relates to an automated collision mitigation system of a vehicle and method thereof.

BACKGROUND

This statements in this section merely provide background information related to the present disclosure and may not constitute prior art. It is reported that in an average month more than 100,000 people are killed in traffic accident around the world. On current trends, the traffic accident keeps increasing as cars become more widespread. In the United States, more than 5.5 million traffic accidents are reported every year. In particular, around 1.7 million rear end collisions of the traffic accidents are occurred each year. It is reported that the rear end collision is most common type of the automobile accident. Due to the rear end collision accidents, it is reported that around 17,000 people are killed and more than 500,000 people are injured in an average year.

In current technology, many lives will be spared by outfitting more vehicles with airbags, the biggest lifesavers in car technology. But now a far greater technology in road safety is within reach. National Transportation Safety Board (NTSB) estimates that around 80% of the death and injuries could be avoided if an automated operation system of a vehicle in certain areas is applied because around 90% of accidents are caused by human error. Lately, lots of technologies for the automated operation are introduced and installed in a vehicle. In particular, leverage advancements in the sensors, cameras and wireless technologies could avoid collisions or reduce severity of the collisions. Several original equipment manufacturers are adding automated features such as Automated Operation in Emergency circumstances or Lane Keep Assist system to increase safety and inhibit accidents.

The above information disclosed in this Background section is only for enhancement of understanding of the background of the present disclosure and therefore it may contain information that does not form the prior art that is already known to a person of ordinary skill in the art.

SUMMARY

The present disclosure relates to a rear collision mitigation system of a vehicle and the method thereof. The rear collision mitigation system can reduce the severity of the rear end collision vehicular accidents. Accordingly, this system of the vehicle reduces the chance of passenger injury and the cost of repair for the vehicle damage from the accidents. Furthermore, the rear collision mitigation system will increase the vehicle's safety and can be marketed as an unique selling point as well as an additional automated safety system.

The rear collision mitigation system can be applied to any model with existing rear sensors capable of detecting the approaching vehicles from the rear end of the vehicle by utilizing currently installed sensors on the vehicle without additional cost. However, the rear collision mitigation system can be easily installed and applied to other models which do not have the installed sensors or cameras with additional cost of adding the cameras or rear sensors, or other systems such as V2V, V2I, V2X and similar data exchange systems for vehicles.

According to one aspect of the present disclosure, a rear collision mitigation system of a vehicle having a braking system and a drivetrain system comprises a vehicle controller and a receiving device. The vehicle controller is operable to determine an impending rear end collision. The vehicle controller is further determines a free space in front of a host vehicle and is operable to accelerate the host vehicle immediately prior to the impending rear end collision and brake the host vehicle immediately after the impending rear end collision. The receiving device is operable to detect parameters of a remote vehicle located rearwardly of the host vehicle.

The vehicle controller is configured to evaluate a stopping distance based on the stored data in the host vehicle and determine whether the stopping distance is less than the determined free space in front of the host vehicle. The vehicle controller is configured to evaluate a collision distance of the host vehicle with the remote vehicle based on the detected parameters of the remote vehicle and stored data of the host vehicle. Furthermore, the vehicle controller is configured to evaluate an accelerating time of the host vehicle to reach a collision point and a time-to-collision of the remote vehicle to collide into the host vehicle at the collision point based on the detected parameters of the remote vehicle, the stored data of the host vehicle and the evaluated distances.

The vehicle controller is further configured to determine to activate the drivetrain system when the vehicle controller indicates that the accelerating time of the host vehicle to reach the collision point is greater than the time-to-collision of the remote vehicle to reach the collision point, and determine to activate the braking system when the vehicle controller indicates that the rear end collision has occurred.

The free space is determined by evaluating an amount of clearance in front of the host vehicle in a current direction of travel, and the clearance is determined by detecting an object in front of the host vehicle or identifying an intersections.

The parameters of the remote vehicle include a mass and a speed of the remote vehicle and a distance between the remote vehicle and the host vehicle, and the stored data of the host vehicle includes a mass and a speed of the host vehicle. The vehicle controller evaluates the accelerating time of the host vehicle to reach the collision point and the stopping distance of the host vehicle through the following formulae:

$$x_{SD} = \frac{(v_{max(T_{ACC})})^2 (m_{HV} + m_{RV})}{2g\mu m_{HV}},$$

where g is a gravitational constant, µ is a coefficient of friction between tire and road, $v_{max}(t)$ is a function of the host vehicle speed over time in case of maximum acceleration applied, $m_{HV}$ is the mass of the host vehicle, $m_{RV}$ is the mass of the remote vehicle, $x_{SD}$ is the stopping distance of the host vehicle and $T_{ACC}$ is the accelerating time of the host vehicle.

The vehicle controller further evaluates a collision distance of the host vehicle by the following formulae: $x_C = x_{FS} - x_{SD}$, where $x_C$ is the collision distance of the host vehicle, $x_{FS}$ is the free space in front of the host vehicle and $x_{SD}$ is the stopping distance of the host vehicle, and the time-to-collision of the remote vehicle to collide into the host vehicle at the collision point by the following formulae: $v_R \times T_{TCC} = x_R + x_C$, where $x_R$ is the distance between the host vehicle and the remote vehicle, $v_R$ is the speed of the remote vehicle, $x_C$ is the collision distance of the host vehicle and $T_{TCC}$ is the time-to-collision of the remote vehicle. The addition of the evaluated stopping distance and collision distance of the host vehicle is not greater than the determined free space The free space is detected by at least one of a front view camera, a front LiDAR sensor or a front Radar sensor, and the parameters of the remote vehicle is detected by at least one of a rear view camera, a rear LiDAR sensor or a rear Radar sensor. Furthermore, the parameters of the remote vehicle are communicated by a vehicle-to-vehicle (V2V) wireless network.

The drivetrain system of the host vehicle is configured to apply maximum acceleration for minimizing the difference in velocity between the host vehicle and the remote vehicle, and apply maximum braking force to come to a complete stop immediately after the rear end collision is occurred.

According to another aspect of the present disclosure, a method provides for mitigating the rear collision of the vehicle having the braking system and the drivetrain system. The method comprises determining the impending rear end collision and the free space in front of the host vehicle. The parameters of the remote vehicle located rearwardly of the host vehicle are detected. The stopping distance and the collision distance of the host vehicle is evaluated with the detected parameters of the remote vehicle and stored data of the host vehicle; and the accelerating time of the host vehicle to reach a collision point and a time-to-collision of the remote vehicle to collide into the host vehicle at the collision point is evaluated with the detected parameters of the remote vehicle, stored data of the host vehicle and the evaluated distances. Furthermore, the drivetrain system is activated when the vehicle controller indicates that the accelerating time of the host vehicle to reach the collision point is greater than the time-to-collision of the remote vehicle to reach the collision point and the braking system is activated when the vehicle controller indicates that the rear end collision has occurred.

Further areas of applicability will become apparent from the description provided herein. Everyone should understand that the description and specific examples presented herein are for the purpose of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the drawings, corresponding reference numerals indicate like or corresponding parts and features.

Figure 1:
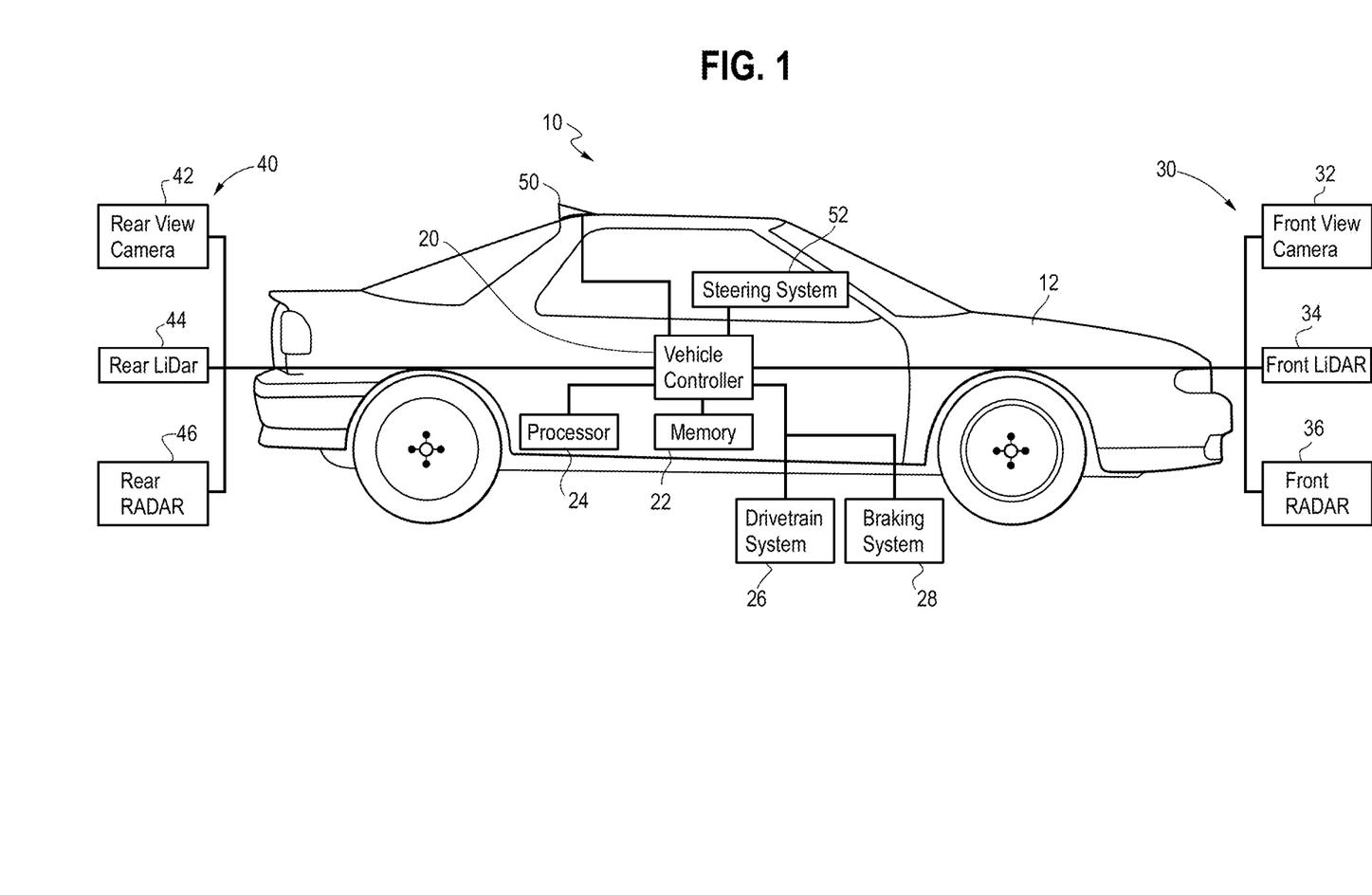
FIG. 1 is a plane view of a vehicle with a rear collision mitigation system in accordance with the present disclosure.

As shown in FIG. 1, a rear collision mitigation system 10 of a vehicle 12 in accordance with one aspect of the present disclosure includes various components. While certain aspects of the disclosure particularly useful in connection with specific types of vehicles, the vehicle 12 may be any type of vehicle including, but not limited to, cars, trucks, motor-cycles, buses, boats, airplanes, lawnmowers, recreation vehicles, amusement park vehicles, farm equipment, construction equipment, trams, golf carts, trains, and trolleys. The rear collision mitigation system 10 monitors front and rear areas of the vehicle 12 to mitigate collisions from distracted approaching remote vehicles 14 (shown in FIG. 2) located rearwardly of the vehicle 12 by using various communicating or measuring devices.

The vehicle 12 has a vehicle controller 20 and at least a receiving device such as a rear collision monitor unit 40 or a communicator 50 for operating the rear collision mitigation system 10. The vehicle controller 20 is interconnected and communicated with the rear collision monitor unit 40 and the communicator 50. The vehicle controller 20 is further interconnected and communicated with a free space monitor unit 30 including a front view camera 32, a front LiDAR 34, a front Radar 36 or similar type devices. Generally, LiDAR known as Light Imaging Detecting and Ranging is a technology which detects objects on the surface, as well as their size and exact disposition by receiving a reflected Laser signal by the objects. Radar known as Radio Detection and Ranging is used to detect objects at a distance, and define their speed and disposition by using sound wave reflection from the objects. The vehicle controller can may be embodied in a hardware manner (e.g., a processor, memory, integrated circuit, etc.), a software manner, or combination of the hardware and the software manner (i.e., a series of commands), which process at least one function or operation.

Figure 2:
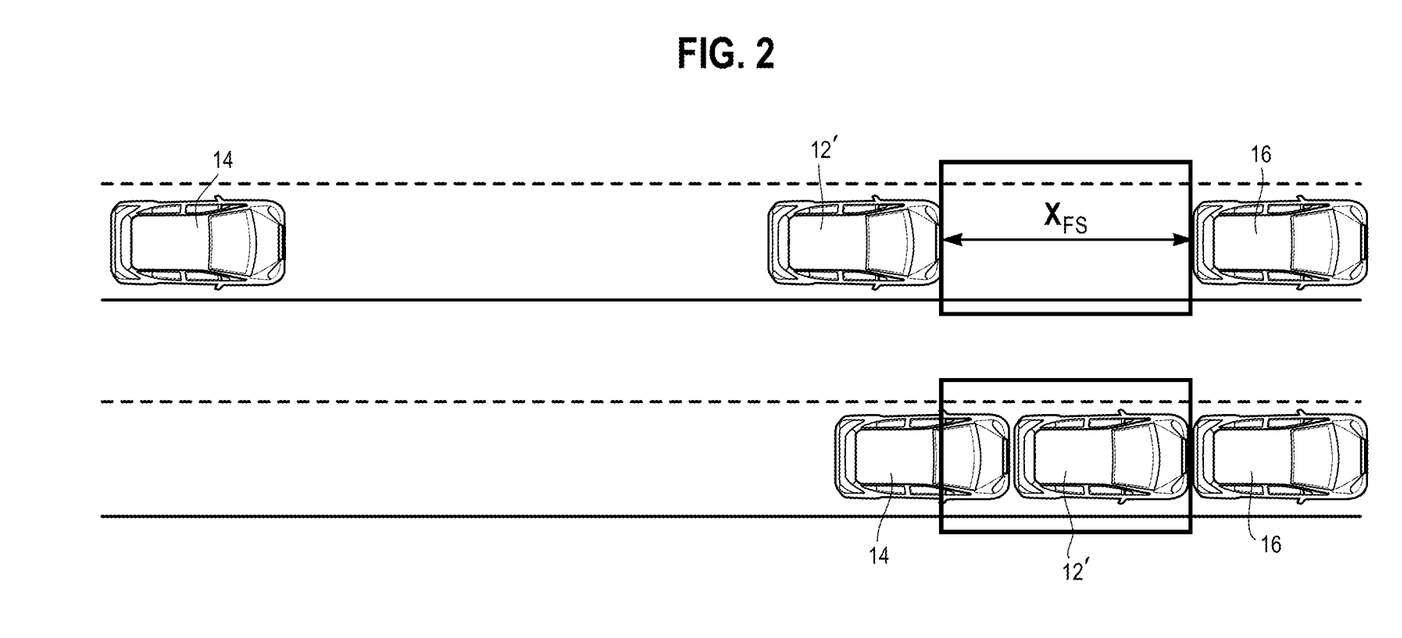
FIG. 2 is a traffic scenario that may be encountered by the system of FIG. 1 in accordance with the present disclosure.

In FIGS. 1 and 2, when a host vehicle 12' approaches or stops at a traffic signal with a front vehicle 16 in front of the host vehicle 12' or has identified that an intersection will be reached at a specific distance, the vehicle controller 20 determines a free space $x_{FS}$ in front of the host vehicle 12' in a current direction of travel by communicating with the free space monitor unit 30. The free space monitor unit 30 can use the front view camera 32 or sensors such as the front LiDAR 34 or the front Radar 36 to detect the amount of clearance in front of the host vehicle 12'. The free space monitor unit 30 with the front camera 32, the front LiDAR 34 and the front Radar 36 may detect any kinds of objects including one or more vehicles and traffic signals for determining the free space $x_{FS}$ in front of the host vehicle 12'.

As shown in FIG. 1, the free space monitor unit 30 may be positioned towards a front area of the vehicle 12. However, this is shown as an example and the front view camera 32, the front LiDAR 34 and the front Radar 36 may be positioned in other areas of the vehicle 12. The free space monitor unit 30 may capture data regarding the position of the objects including vehicles and traffic signals located in front of the vehicle 12 and data regarding the speed and/or braking activity of the vehicles in front of the vehicles 12. Accordingly, the vehicle controller 20 of the vehicle 12 receives the detected data from the free space monitor unit 30 and determines the free space $x_{FS}$ based on the detected data.

In FIGS. 1 and 2, the rear collision monitor unit 40 also includes a rear view camera 42, a rear LiDAR 44 and a rear Radar 46. Generally, the rear collision monitor unit 40 can detect rear approaching vehicles by utilizing the rear view camera 42, the rear LiDAR 44, the rear Radar 46 or similar type devices. The rear view camera 42, the rear LiDAR 44 and the rear Radar 46 may be positioned toward a rear area of the vehicle 12. However, this is shown as an example and the devices may be positioned in other areas of the vehicle 12.

The rear collision monitor unit 40 may be used to capture data regarding the position of one or more vehicles approaching to the host vehicle 12' and the speed and/or braking activity of the remote vehicle 14 located rearwardly of the host vehicle 12'. In addition to capturing those data, the rear collision unit further captures data regarding a mass of the rear remote vehicle $m_{RV}$ by utilizing object recognition software. The vehicle 12 can use the rear view camera 42, the rear LiDAR 44 or the rear high resolution Radar 46 to identify the rear remote vehicle's 14 classification and type, and then the object recognition software can estimate the mass of the rear remote vehicle $m_{RV}$ based on a generalized classification of the rear remote vehicle 14 characteristics stored in a memory 22 of the vehicle controller 20.

In accordance with a form of the present disclosure, the free space monitor unit 30 and the rear collision unit 40 may be part of an existing system in the vehicle 12. For example, both cameras 32, 42 and all the sensors 34, 36, 44, 46 may be part of an automated parking assist system of the vehicle 12. The above-mentioned cameras or sensors such as LiDARs and Radars are given as an example and should not been in a limiting manner.

Alternatively, as shown in FIG. 1, instead of using the free space monitor unit 30 or the rear collision monitor unit 40, the vehicle 12 may obtain data with the communicator 50. The communicator 50 is also interconnected and communicated with the vehicle controller 20. The communicator 50 sends or receives signal by vehicle-to-vehicle (V2V) wireless network or vehicle-to-infrastructure (V2I) wireless network. The V2V wireless network may allow dynamic wireless exchange of data between nearby vehicles. Thus, vehicle related data such as location, speed, mass and other data may be transmitted from the one or more vehicles located around the vehicle 12. The V2I wireless network is an exchange of operational data such as traffic signal's location or other vehicles' data between vehicles and road infrastructure intended to enable a wide range of safety, mobility and environment benefits. For example, a traffic controller may adjust traffic light timings to achieve better traffic efficiency or incorporate its status to aid in the mitigation of rear end collisions such as reducing cross traffic interference by V2I wireless network.

In FIGS. 1 and 2, the rear collision mitigation system 10 may use the V2V wireless network for obtaining the data regarding the rear remote vehicle 14. The communicator 50 may be used to receive vehicle related data such as location, speed $v_R$ and mass $m_{RV}$ of the rear remote vehicle directly from the rear remote vehicle 14. Through the V2V wireless network, the communicator 50 receives the unique data such as mass $m_{RV}$, speed $v_R$ and location of the rear remote vehicle 14 which allows for the rear collision mitigation system 10 to have more accurate data of the rear remote vehicle 14.

Alternatively, as mentioned above, the rear collision mitigation system 10 may use the V2I wireless network for obtaining the data such as intersection location, traffic signal or other vehicles' data around the host vehicle 12'. Through the V2I wireless network, the host vehicle 12' may determine the free space $x_{FS}$ in front of the host vehicle 12' by receiving the location of the front vehicle 16 or the location of the intersection including traffic signals from a roadside unit nearby the intersection. Furthermore, the communicator 50 of the host vehicle 12' may receive vehicle related data such as location, speed $v_R$ and mass $m_{RV}$ of the rear remote vehicle 14 from the roadside unit having stored the vehicles' data nearby the roadside unit. In particular, the mass $m_{RV}$ of the rear remote vehicle could be gathered by scales on the road or other weight measurement devices.

In FIG. 1, the vehicle 12 may have one or more computers, such as the vehicle controller 20 containing a processor 24, a memory 22 and other components typically present in general purpose computers. The memory 22 stores its own vehicle information such as location, speed, mass and other data of the vehicle 12. The memory 22 may be of any type capable of storing information accessible by the processor 24, including a computer-readable medium, or other medium that stores data that may be read with the aid of an electronic device, such as a memory card or other optical disks.

As mentioned above, the vehicle controller 20 is interconnected and communicated with the free space monitor unit 30, the rear collision monitor unit 40 and the communicator 50, e.g. via CAN or other network. The vehicle controller 20 may take and process the data captured by the free space monitor unit 30 or the data received from the communicator 50 through V2V or V2I wireless network in order to evaluate and identify the free space $x_{FS}$ in front of the vehicle 12. In further, the vehicle controller 20 may take and process data captured by the rear collision monitor unit 40 or the data received by the communicator 50 through V2V or V2I wireless network in order to evaluate and identify the speed $v_R$ and mass $m_{RV}$ of the rear remote vehicle 14 and a distance $x_R$ between the host vehicle 12' and the rear remote vehicle 14. In addition, the vehicle controller 20 may take and process the stored data such as a host vehicle speed over time $v_{max}(t)$, and a mass of the host vehicle $m_{HV}$ from the memory 22.

In FIG. 1, the vehicle controller 20 may control the direction and speed of the vehicle 12 by being interconnected and communicated with a braking system 28 and a drivetrain system 26. The drivetrain system 26 is the group of components that deliver power to the driving wheels by adjusting a fuel or other energy. Accordingly, the drivetrain system 26 causes the vehicle 12 to accelerate or decelerate, and the braking system 28 causes the vehicle 12 to come to a complete stop by communicating with the vehicle controller 20.

As one of the optional feature of the present disclosure, the braking system 28 of the host vehicle 12' can be controlled by more precise control process of the vehicle controller 20. For example, the vehicle controller 20 of the host vehicle 12' may determine the most appropriate response to imminent collision by applying front brakes but leaving rear brakes inactivated because each wheel can be controlled independently.

As shown in FIGS. 1 and 2, the present disclosure of the rear collision mitigation system 10 optionally includes a steering system 52. The steering system 52 is interconnected and communicated with the vehicle controller 20. The vehicle controller 20 allows the steering system 52 to steer the vehicle 12 in addition to activating the drivetrain system 26 or the braking system 28 for mitigating the collision. For example, if the front space $x_{FS}$ is not enough (ex. limited by the vehicle 16 or an intersection) for the host vehicle 12' to move, the vehicle controller 20 of the host vehicle 12' could steer around the vehicle 16 in front of the host vehicle 12'. Accordingly, the result is much greater effect for mitigating the rear end collision of the host vehicle 12'.

Figure 3:
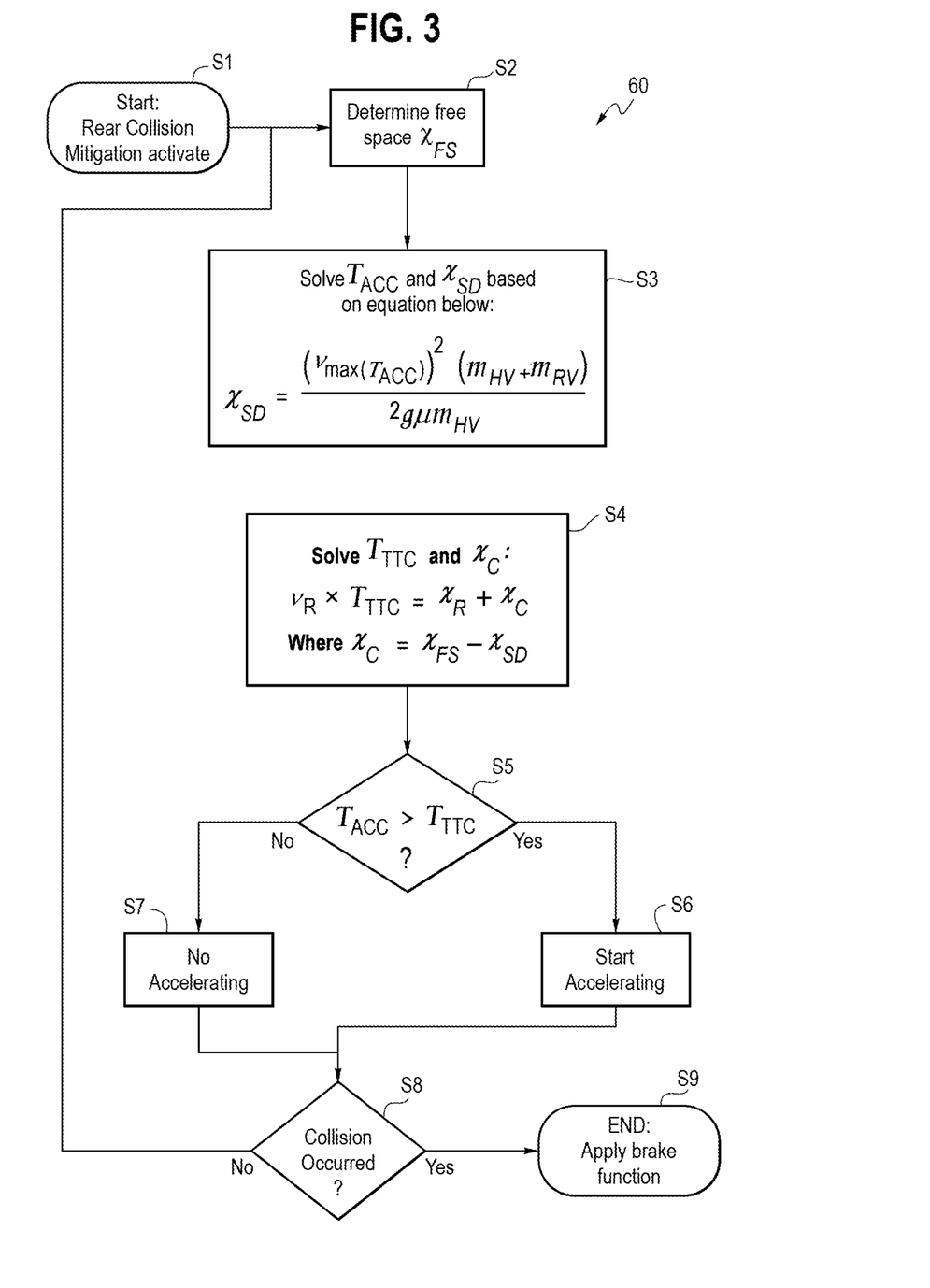
FIG. 3 is a flow diagram of the rear collision mitigation system in accordance with the present disclosure.
Figure 4:
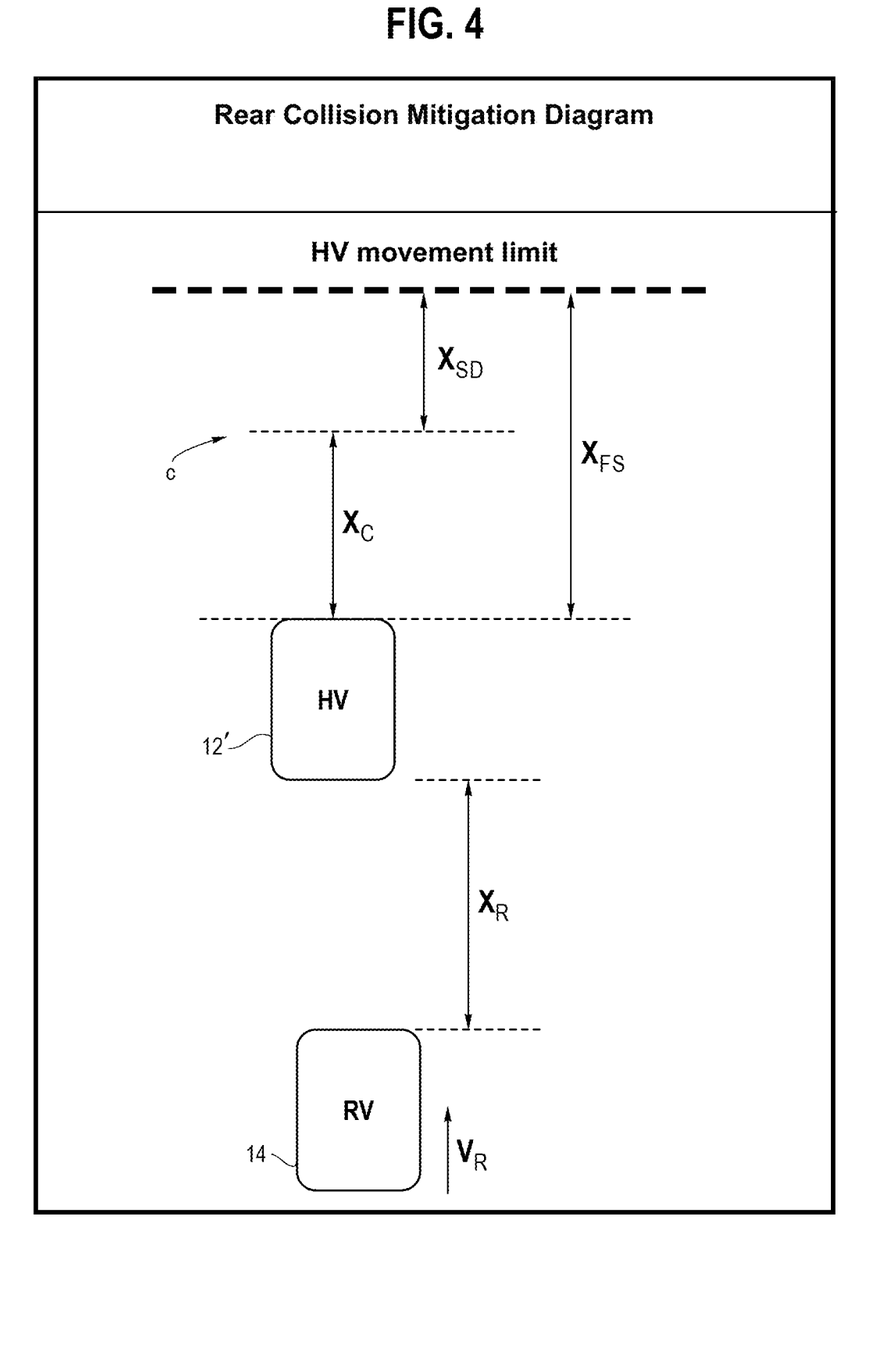
FIG. 4 is a rear collision mitigation diagram in accordance with the present disclosure.

Referring now to FIGS. 3 and 4, a flow diagram 60 of FIG. 3 provides an exemplary overview of the rear collision mitigation system 10 of the host vehicle 12'. As shown in FIG. 3, the flow diagram 60 of the rear collision mitigation system 10 illustrated when the host vehicle 12' is stationary as an example. However, the control logic sequence of the flow diagram 60 could be adopted to work with a moving host vehicle as well.

In block S1 of FIG. 3, the vehicle controller 20 of the host vehicle 12' may activate the rear collision mitigation system 10 when the vehicle controller 20 indicates that a rear end collision into the host vehicle 12' by the rear remote vehicle 14 is imminent. The host vehicle 12' may detect the rear remote vehicle 14 by using the rear collision monitor unit 40 or continuously receiving signal from the rear remote vehicle 14 through V2V wireless network. The vehicle controller 20 of the host vehicle 12' may determine that the rear end collision is imminent by evaluating a minimum stopping distance of the rear remote vehicle 14. However, the above determination that the rear end collision is imminent is given as an example and should not been in a limiting manner for the rear end collision determination of the vehicle controller 20. Accordingly, when the rear end collision is deemed imminent, the processor 24 of the vehicle controller 20 may initiate a rear collision mitigation control logic sequence as shown in the flow diagram 60.

In block S2 of FIG. 3, the vehicle control unit 20 determines the free space $x_{FS}$ in front of the host vehicle 12'. As shown in FIG. 4, the free space $x_{FS}$ is determined by the detected data from the free space monitor unit 30 or the received data from the communicator 50. The free space $x_{FS}$ is defined as a possible movement limit of the host vehicle 12' in front of the host vehicle 12' when the vehicle controller 20 indicates that the rear end collision is deemed imminent.

In block S3 of FIG. 3, the processor 24 of the vehicle controller 20 determines a stopping distance $x_{SD}$ which the host vehicle 12' needs to be able to come a complete stop after collision and an accelerating time $T_{ACC}$ needed for the host vehicle 12' to accelerate to a collision point C from the time it decides to start accelerating. The vehicle controller 20 evaluates the stopping distance $x_{SD}$ and the accelerating time $T_{ACC}$ of the host vehicle 12' with the determined free space $x_{FS}$, the detected data such as the mass of the rear remote vehicle $m_{RV}$ and the stored data such as the mass of the host vehicle $m_{HV}$ and a function of the host vehicle speed over time by the following formulae:

$$x_{SD} = \frac{(v_{max(T_{ACC})})^2 (m_{HV} + m_{RV})}{2g\mu m_{HV}},$$

where g is a gravitational constant, $\mu$ is a coefficient of friction between tire and road, $v_{max}(t)$ is the function of the host vehicle speed over time in case of maximum acceleration applied, $m_{HV}$ is the mass of the host vehicle 12', $m_{RV}$ is the mass of the rear remote vehicle 14, $x_{SD}$ is the stopping distance of the host vehicle 12' and $T_{ACC}$ is the accelerating time of the host vehicle to reach the collision point C. In actual implementation, the function of the host vehicle speed could be modeled with equations or be stored as numerical data in the memory 22 of the vehicle controller 20.

In block S4 of FIG. 3, the process 24 of the vehicle controller 20 determines a collision distance $x_C$ from the front of the host vehicle 12' to the collision point C as shown in FIG. 4. The collision distance $x_C$ gives the host vehicle 12' the most space to accelerate, but provides that the host vehicle 12' will stop before the possible movement limit. Accordingly, the collision distance $x_C$ is evaluated with the determined stopping distance $x_{SD}$ and free space $x_{FS}$ by the following formulae: $x_C = x_{FS} - x_{SD}$, where $x_C$ is the collision distance of the host vehicle 12', $x_{FS}$ is the free space in front of the host vehicle 12' and $x_{SD}$ is the stopping distance of the host vehicle 12'.

As shown in a diagram of FIG. 4, an addition of the stopping distance $x_{SD}$ and the collision distance $x_C$ is not greater than the free space $x_{FS}$. Accordingly, the collision distance $x_C$ is determined as the maximum distance that the host vehicle 12' can move forward without risking to exceed the forward free space $x_{FS}$.

Furthermore, in block S4 of FIG. 3, the vehicle controller 20 determines a time-to-collision $T_{TTC}$ when the rear end collision into the host vehicle 12' by the rear remote vehicle 14 is occurred at the collision point C. The processor 24 of the vehicle controller 20 evaluates the time-to-collision $T_{TTC}$ with the above-determined data by the following formulae: $v_R \times T_{TTC} = x_R + x_C$, where $x_R$ is the distance between the host vehicle 12' and the rear remote vehicle 14 and $v_R$ is the speed of the rear remote vehicle 14 as shown in FIG. 4.

In block S5 of FIG. 3, based on the evaluation in previous steps, the vehicle controller 20 determines whether or not the host vehicle 12' starts accelerating forward at maximum acceleration. If the vehicle controller 20 indicates that the time-to-collision $T_{TTC}$ is less than the accelerating time $T_{ACC}$ needed for the host vehicle 12' to accelerate to the collision point C, then the vehicle controller 20 determines to activate the drivetrain system 26 of the host vehicle 12'. Otherwise, the vehicle controller 20 of the host vehicle 12' repeats the evaluation in the next time cycle. Accordingly, as in block S6 of FIG. 3, the host vehicle 12' starts accelerating by the activated drivetrain system. Even in the case the host vehicle 12' starts accelerating, the vehicle controller 20 continuously repeats the evaluation to determine whether or not the rear end collision of the host vehicle 12' is deemed imminent.

In block S5 of FIG. 3, however, If the vehicle controller 20 indicates that the time-to-collision $T_{TTC}$ is greater than the accelerating time $T_{ACC}$, then the vehicle controller 20 determines not to activate the drivetrain system 26 of the host vehicle 12'. Accordingly, as in block S7 of FIG. 3, the host vehicle 12' does not start accelerating because the drivetrain system 26 is not activated.

In block S8 of FIG. 3, the vehicle controller 20 determines whether or not the rear end collision into the host vehicle 12' by the rear remote vehicle 14 is actually occurred. If the rear end collision is actually occurred, the vehicle controller 20 determine to activate the braking system 28 and the braking system 28 applies maximum braking force to come to a complete stop as shown in block S9 of FIG. 3. As illustrated above and shown in FIG. 4, the stopping distance $x_{SD}$ of the host vehicle 12' from the collision point C should not be over the determined movement limit of the host vehicle 12'. In further, if the rear end collision is not actually occurred, the vehicle controller 20 of the host vehicle 12' repeats the evaluations in the next time cycle.

Figure 5:
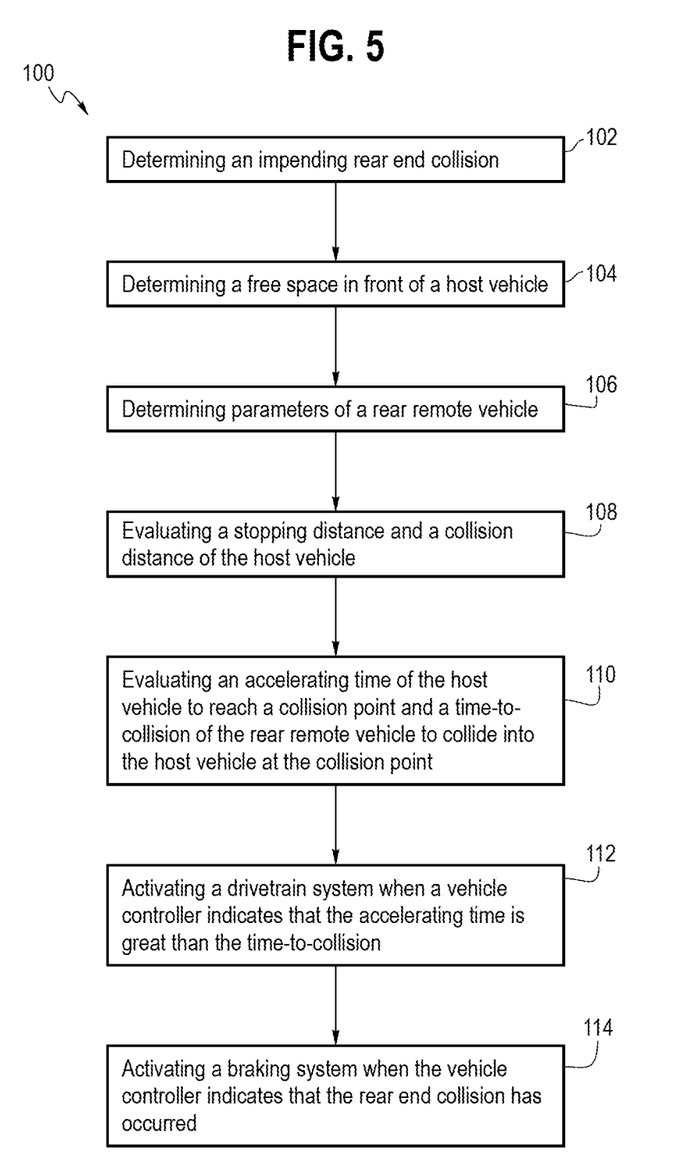
FIG. 5 is a method of the rear collision mitigation system in accordance with the present disclosure.

FIG. 5 shows a diagram illustrating a method 100 for the rear collision mitigation of the vehicle in accordance with the present disclosure. As shown in FIG. 5, the method 100 may comprises a step of determining 102 an impending rear end collision of the host vehicle 12'. Furthermore, the method 100 of the rear collision mitigation system 10 comprises a step of determining 104 the free space $x_{FS}$ in front of the host vehicle 12' and a step of detecting 106 parameters of the rear remote vehicle 14.

The method 100 of the rear collision mitigation system 10 also comprises a step of evaluating 108 the stopping distance $x_{SD}$ and the collision distance $x_C$ of the host vehicle 12' with the detected parameters of the rear remote vehicle 14 and the stored data of the host vehicle 12'. In addition, the method 100 further comprises a step of evaluating 110 the accelerating time $T_{ACC}$ of the host vehicle 12' to reach the collision point C and the time-to-collision $T_{TTC}$ of the rear remote vehicle 14 to collide into the rear end of the host vehicle 12' at the collision point C with the detected parameters of the rear remote vehicle 14, stored data of the host vehicle 12' and the evaluated distances.

The method 100 of the rear collision mitigation system 10 comprises a step of activating 112 the drivetrain system 26 when the vehicle controller 20 indicates that the accelerating time $T_{ACC}$ of the host vehicle 12' to reach the collision point C is greater than the time-to-collision $T_{TTC}$ of the rear remote vehicle 14 to reach the collision point C. The method 100 further comprises a step of activating 114 the braking system 28 when the vehicle controller 20 indicates that the rear end collision is occurred at the collision point C.

The present disclosure of the rear collision mitigation system 10 can be also applied different traffic scenario such as the rear approaching vehicle with an angle or multiple vehicles' collision in the path of the initial detected rear end collision. For example, when the rear remote vehicle 14 could be approaching to the host vehicle 12' with the angle (i.e. not straight from the rear side of the host vehicle). When the rear remote vehicle 14 is approaching to the host vehicle 12' with an angle, the evaluation will accommodate the new scenario based on the control logic sequence described above. Accordingly, the rear collision mitigation system 10 can be easily adapted to the different traffic scenario.

Furthermore, the present disclosure of the rear collision mitigation system 10 can be applied to an imminent front collision of a vehicle. When a vehicle is stationary or moving and a front remote vehicle is approaching from the front of the vehicle, the vehicle maneuvers based on a free space in the rear area instead of the front area of the vehicle in accordance with the control logic sequence described in the present disclosure above.

The foregoing description of various forms of the present disclosure has been presented for purposes of illustration and description. It is not intended to be exhaustive or to limit the present disclosure to the precis forms disclosed. Numerous modifications or variations are possible in light of the above teachings. The forms discussed were chosen and described to provide the best illustration of the principles of the present disclosure and its practical application to thereby enable one of ordinary skill in the art to utilize the present disclosure in various forms and with various modifications as are suited to the particular use contemplated. All such modifications and variations are within the scope of the present disclosure as determined by the appended claims when interpreted in accordance with the breadth to which they are fairly, legally, and equitably entitled.

What is claimed is:

1. A rear collision mitigation system of a host vehicle having a braking system and a drivetrain system, the rear collision mitigation system comprising:
   a vehicle controller operable to determine an impending rear end collision, the vehicle controller determining a free space in front of the host vehicle and operable to accelerate the host vehicle immediately prior to the impending rear end collision and brake the host vehicle immediately after the impending rear end collision;
   a receiving device operable to detect parameters of a remote vehicle located rearwardly of the host vehicle;
   wherein the vehicle controller is configured to evaluate a stopping distance based on stored data in the host vehicle and determine whether the stopping distance is less than the determined free space in front of the host vehicle;
   wherein the vehicle controller is configured to evaluate a collision distance of the host vehicle with the remote vehicle based on the detected parameters of the remote vehicle and stored data of the host vehicle;
   wherein the vehicle controller is configured to evaluate an accelerating time of the host vehicle to reach a collision point and a time-to-collision of the remote vehicle to collide into the host vehicle at the collision point based on the detected parameters of the remote vehicle, the stored data of the host vehicle and the evaluated distances;
   wherein the vehicle controller is configured to activate the drivetrain system when the vehicle controller indicates that the accelerating time of the host vehicle to reach the collision point is greater than the time-to-collision of the remote vehicle to reach the collision point; and
   wherein the vehicle controller is configured to activate the braking system when the vehicle controller indicates that the rear end collision has occurred.

2. The rear collision mitigation system of claim 1, wherein the free space is determined by evaluating an amount of clearance in front of the host vehicle in a current direction of travel.

3. The rear collision mitigation system of claim 2, the clearance is determined by detecting an object in front of the host vehicle or identifying an intersection.

4. The rear collision mitigation system of claim 1, wherein the parameters of the remote vehicle include a mass and a speed of the remote vehicle, and a distance between the remote vehicle and the host vehicle; and wherein the stored data of the host vehicle includes a mass and a speed of the host vehicle.

5. The rear collision mitigation system of claim 4, wherein the vehicle controller evaluates the accelerating time of the host vehicle to reach the collision point and the stopping distance of the host vehicle through a following formula:

$$x_{SD} = \frac{(v_{max(T_{ACC})})^2 (m_{HV} + m_{RV})}{2g\mu m_{HV}},$$

where g is a gravitational constant, μ is a coefficient of friction between tire and road, $v_{max}(t)$ is a function of the host vehicle speed over time in case of maximum acceleration applied, $m_{HV}$ is the mass of the host vehicle, $m_{RV}$ is the mass of the remote vehicle, $x_{SD}$ is the stopping distance of the host vehicle and $T_{ACC}$ is the accelerating time of the host vehicle.

6. The rear collision mitigation system of claim 5, wherein the vehicle controller evaluates the collision distance of the host vehicle by a following formula: $x_C = x_{FS} - x_{SD}$, where $x_C$ is the collision distance of the host vehicle, $x_{FS}$ is the free space in front of the host vehicle and $x_{SD}$ is the stopping distance of the host vehicle.

7. The rear collision mitigation system of claim 6, wherein the vehicle controller evaluates the time-to-collision of the remote vehicle to collide into the host vehicle at the collision point by a following formula: $v_R \times T_{TCC} = x_R + x_C$, where $x_R$ is the distance between the host vehicle and the remote vehicle, $v_R$ is the speed of the remote vehicle, $x_C$ is the collision distance of the host vehicle and $T_{TCC}$ is the time-to-collision of the remote vehicle.

8. The rear collision mitigation system of claim 1, wherein an addition of the evaluated stopping distance and collision distance of the host vehicle is not greater than the determined free space.

9. The rear collision mitigation system of claim 1, wherein the free space is detected by at least one of a front view camera, a front LiDAR sensor or a front Radar sensor.

10. The rear collision mitigation system of claim 1, wherein the parameters of the remote vehicle is detected by at least one of a rear view camera, a rear LiDAR sensor or a rear Radar sensor.

11. The rear collision mitigation system of claim 1, wherein the parameters of the remote vehicle is communicated by a vehicle-to-vehicle (V2V) wireless network.

12. The rear collision mitigation system of claim 1, wherein the drivetrain system of the host vehicle is configured to apply maximum acceleration for minimizing the difference in velocity between the host vehicle and the remote vehicle.

13. The rear collision mitigation system of claim 1, wherein the braking system of the host vehicle is configured to apply maximum braking force to come to a complete stop immediately after the rear end collision is occurred.

14. A method for mitigating the rear collision of a host vehicle having a braking system and a drivetrain system, the method comprising:
   determining an impending rear end collision;
   determining a free space in front of the host vehicle;
   detecting parameters of a remote vehicle located rearwardly of the host vehicle;
   evaluating a stopping distance and a collision distance of the host vehicle with the detected parameters of the remote vehicle and stored data of the host vehicle;
   evaluating an accelerating time of the host vehicle to reach a collision point and a time-to-collision of the remote vehicle to collide into the host vehicle at the collision point with the detected parameters of the remote vehicle, stored data of the host vehicle and the evaluated distances;
   activating the drivetrain system when a vehicle controller indicates that the accelerating time of the host vehicle to reach the collision point is greater than the time-to-collision of the remote vehicle to reach the collision point; and
   activating the braking system when the vehicle controller indicates that the rear end collision has occurred.

15. The method of claim 14, wherein the parameters of the remote vehicle include a mass and a speed of the remote vehicle, and a distance between the remote vehicle and the host vehicle; and wherein the stored data of the host vehicle includes a mass and a speed of the host vehicle.

16. The method of claim 15, wherein the vehicle controller evaluates the accelerating time of the host vehicle to reach the collision point and the stopping distance of the host vehicle through a following formula:

$$x_{SD} = \frac{(v_{max(T_{ACC})})^2 (m_{HV} + m_{RV})}{2g\mu m_{HV}},$$

where g is a gravitational constant, $\mu$ is a coefficient of friction between tire and road, $v_{max}(t)$ is a function of the host vehicle speed over time in case of maximum acceleration applied, $m_{HV}$ is the mass of the host vehicle, $m_{RV}$ is the mass of the remote vehicle, $x_{SD}$ is the stopping distance of the host vehicle and $T_{ACC}$ is the accelerating time of the host vehicle.

17. The method of claim 16, wherein the vehicle controller evaluates the collision distance of the host vehicle by a following formula: $x_C = x_{FS} - x_{SD}$, where $x_C$ is the collision distance of the host vehicle, $x_{FS}$ is the free space in front of the host vehicle and $x_{SD}$ is the stopping distance of the host vehicle.

18. The method of claim 17, wherein the vehicle controller evaluates the time-to-collision of the remote vehicle to collide into the host vehicle at the collision point by a following formula: $v_R \times T_{TCC} = x_R + x_C$, where $x_R$ is the distance between the host vehicle and the remote vehicle, $v_R$ is the speed of the remote vehicle, $x_C$ is the collision distance of the host vehicle and $T_{TCC}$ is the time-to-collision of the remote vehicle.

19. The method of claim 14, wherein an addition of the evaluated stopping distance and collision distance of the host vehicle is not greater than the determined free space.

* * * * *